Jan. 19, 1965  E. H. OSTEEN  3,165,874
BLOWER FOR COMBINES
Filed Jan. 7, 1963  3 Sheets-Sheet 1
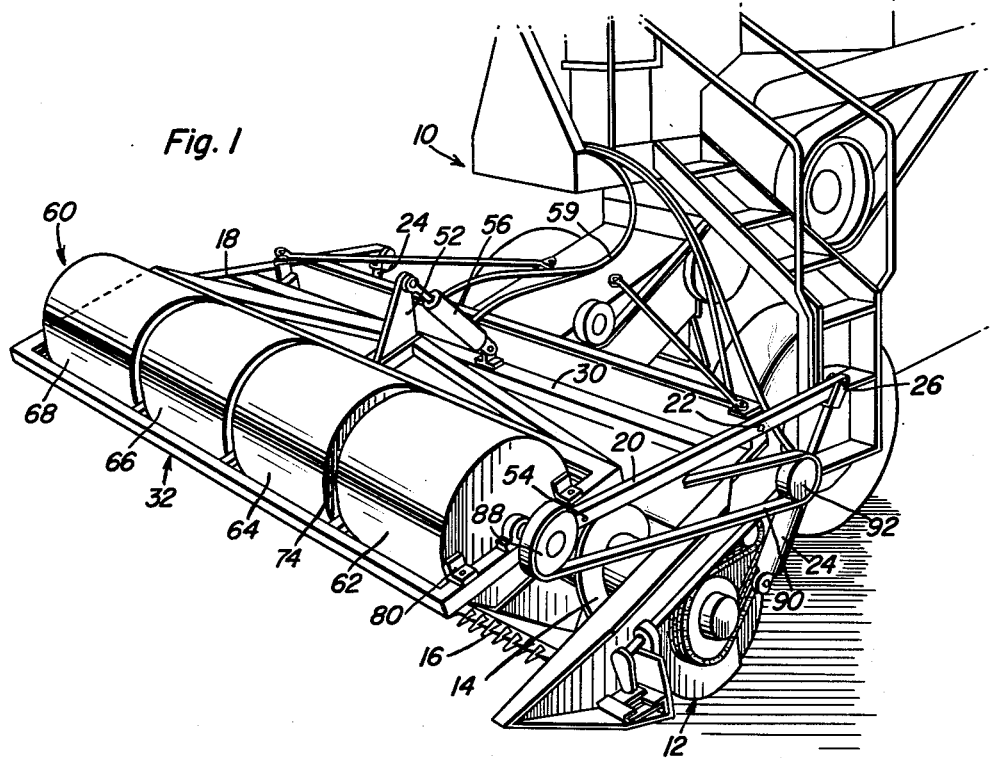
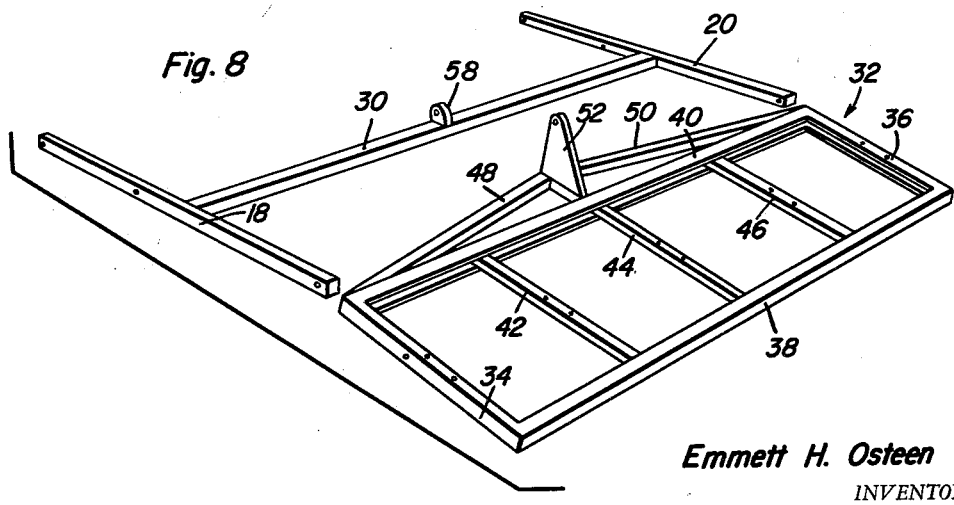
Emmett H. Osteen
INVENTOR.

Jan. 19, 1965     E. H. OSTEEN     3,165,874
BLOWER FOR COMBINES
Filed Jan. 7, 1963     3 Sheets-Sheet 2
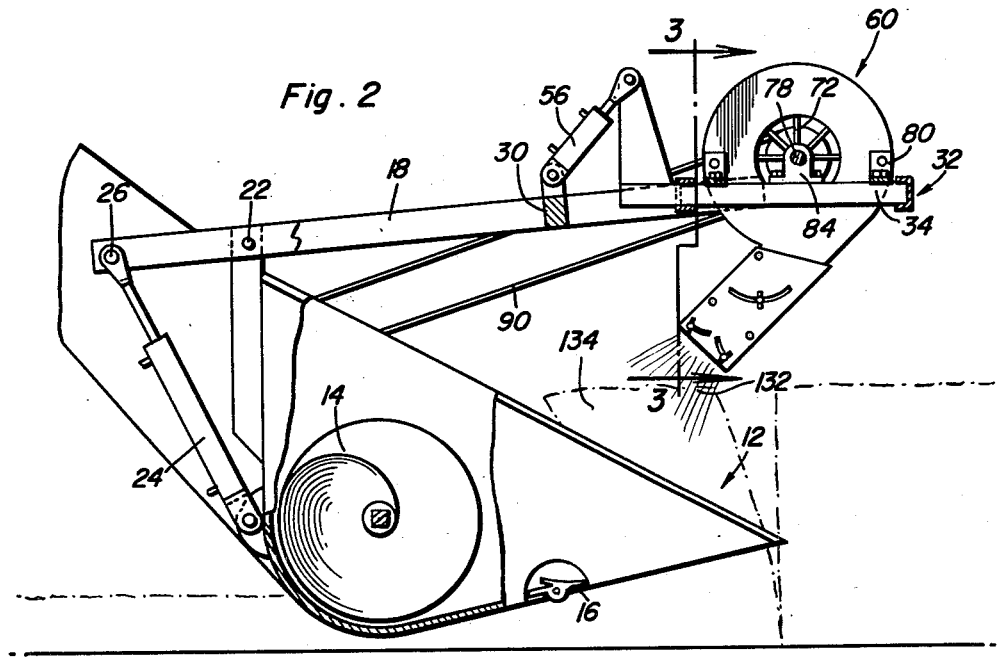
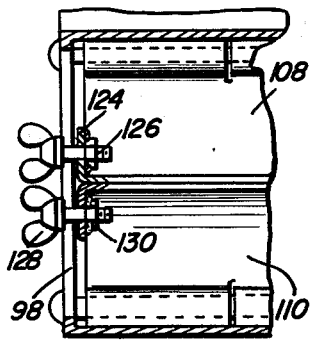
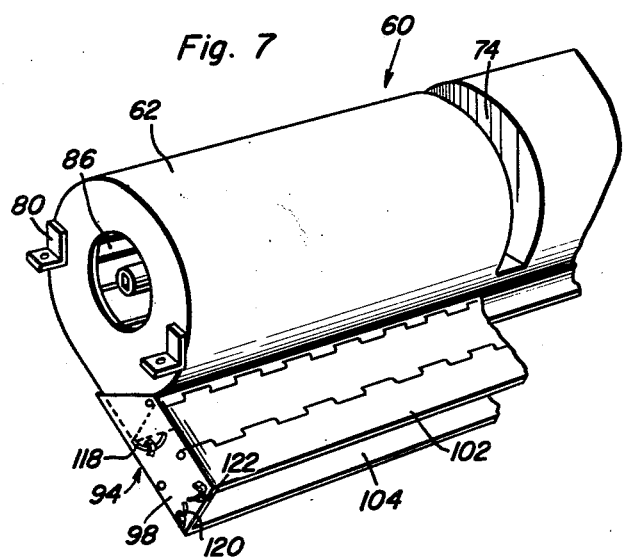
Emmett H. Osteen
INVENTOR.

Jan. 19, 1965 E. H. OSTEEN 3,165,874
BLOWER FOR COMBINES
Filed Jan. 7, 1963 3 Sheets-Sheet 3
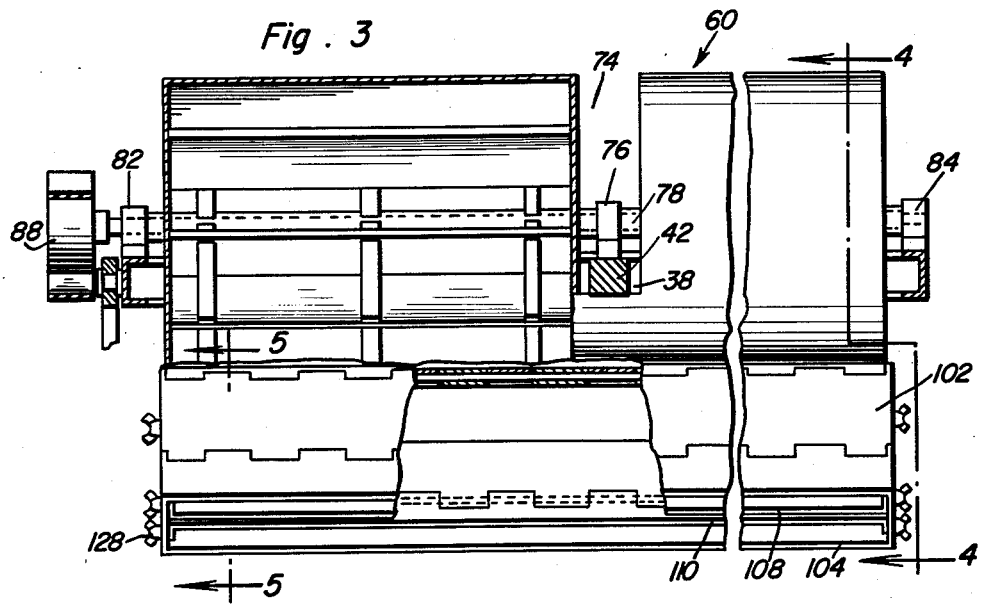
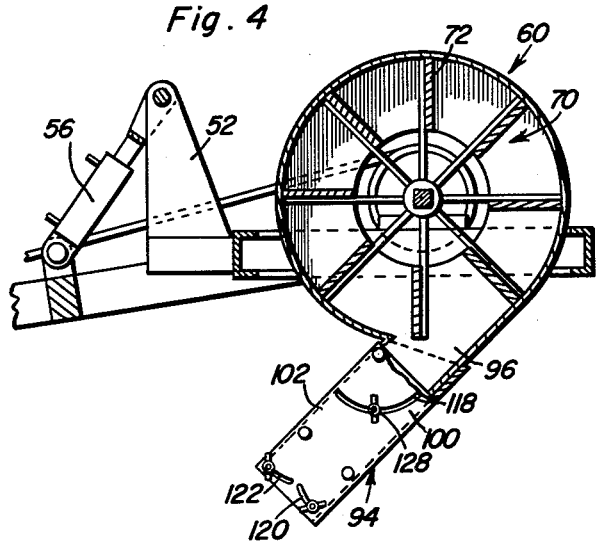
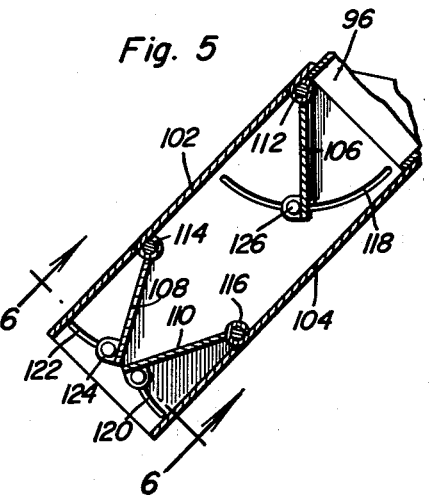
Emmett H. Osteen
INVENTOR.

United States Patent Office 3,165,874
Patented Jan. 19, 1965

3,165,874
BLOWER FOR COMBINES
Emmett H. Osteen, Box 273, Walsh, Colo.
Filed Jan. 7, 1963, Ser. No. 249,774
8 Claims. (Cl. 56—23)

This invention generally relates to an improved mechanism for harvesters or combines involving blower means for assisting in moving grain about to be cut over a cutter assembly of the harvester or combine wherein grain waste and shatter are practically eliminated.

Heretofore, a reel was mounted at the forward end of the combine which contacted the grain prior to the cutting of the stalks thereof and forced the stalks down towards the cutter assembly in order that all the grain stalks in the path of the cutter assembly were cut and gathered by the combine. This reel insured that no grain stalks were left standing after the combine had passed over the area and tended to force the grain stalks into the combine and cutter assembly. However, problems were encountered in that the reel contacting the heads of the grain stalks prior to their cutting would shatter that heads causing a great waste of the grain. In order to eliminate the above-mentioned difficulties, the device comprising the subject matter of the present invention was developed. In brief, the invention comprises a blower attachment which is substituted for the aforementioned reel and wherein the force of air emanating therefrom will cause the grain stalks to lean into the cutter bar and will cause the heads to be cut uniformly thus eliminating the possibility that the grain heads will be struck by the reel which causes the shatter and waste just mentioned. The blower means will also cause the grain heads to be cut uniformly and will keep the cutter bar clean and force the grain onto a conveyor leading into the combine. Furthermore, by using the present invention it is possible to operate the the combine at a faster speed than with the conventional type of reel and the blower practically eliminates any standing grain after the combine has passed over the area which is being harvested.

Accordingly, it is the primary object of this invention to provide blower means disposed in advance of the cutter bar of a combine which is adapted to force grain which is about to be cut rearwardly into the cutter.

It is a further object of this invention to eliminate any contact with the grain heads prior to their being cut.

It is a further object of this invention to provide blower means of the character indicated, the position of which on the combine may be adjusted so that the maximum effect thereof may be utilized.

A still further object of this invention is to provide a device of the character indicated wherein adjustable baffle means are provided on the blower to vary the volume of air emitted therefrom.

A still further object of this invention is the provision of means associated with the blower wherein the direction of the air emitted therefrom may be controlled.

A still further object of this invention is to provide a means of the character indicated which will clean the cutter assembly of a combine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the blower assembly comprising the subject matter of the instant invention mounted upon a conventional combine.

FIGURE 2 is a side elevation of the combine header with the blower attachment shown mounted thereon.

FIGURE 3 is a vertical longitudinal sectional view taken upon an enlarged scale substantially upon the plane indicated by the broken section line 3—3 of FIGURE 2 illustrating certain details of the blower assembly having certain parts thereof removed for clarity.

FIGURE 4 is a detailed sectional view taken upon the plane indicated by the broken section line 4—4 of FIGURE 3 and illustrating further details of the blower assembly.

FIGURE 5 is a detailed sectional view taken substantially upon the plane indicated by the section line 5—5 of FIGURE 3 and illustrating the baffle attachment to the blower means.

FIGURE 6 is a fragmentary sectional view taken upon an enlarged scale substantially upon the plane indicated by the section line 6—6 of FIGURE 5 and illustrating the baffle arrangement.

FIGURE 7 is a fragmentary perspective view of the inverted blower and baffle assembly.

FIGURE 8 is an exploded perspective view of the frame means utilized to mount the blower means of the present invention.

Referring now in detail to the drawings, a conventional type combine is generally designated by the reference numeral 10, the details of which form no part of the instant invention. Mounted at the forward end of the combine is a conventional header 12. Mounted within the header is a conventional auger-type conveyor 14 for conveying cut grain to the combine thresher. Also, mounted within the header are a plurality of conventional reciprocating sickle cutting heads 16 for cutting grain stalks as the combine is moved through the grain field.

A pair of reel carrier arms generally designated as 18 and 20 are normally pivotally mounted upon the header as shown at 22. Hydraulic cylinders 24 mounted on the header at opposite sides thereof and having suitable connections with hydraulic means on the combine are pivotally connected to one end of each of the reel carrier arms 18 and 20 as illustrated at 26. The cylinders 24 are utilized in this invention to raise, lower and tilt the blower assembly unit which will hereinafter be described. The reel carrier arms 18 and 20 are bridged and rigidified by a connecting bar 30. Pivotally mounted on the reel carrier arms 18 and 20 at their ends remote from the connections with the cylinders 24 is a blower mounting frame generally designated as 32, see FIGURE 8. The frame 32 is generally rectangular in shape and comprises side walls 34 and 36 and end walls 38 and 40. A plurality of bars indicated at 42, 44, and 46 extend between the end walls 40 and 38 parallel to side walls 34 and 36 of the the frame 32, for the purpose which will hereinafter be described. Also formed integral with the end wall 40 are two members 48 and 50 which are joined together at one end of each member to form a V-shaped frame extension as seen in FIGURE 8. Mounted at the apex of the V-shaped frame extension is an upstanding apertured lug 52. The frame 32 is pivotally mounted upon the reel carrier arms 18 and 20 as indicated at 54, see FIGURE 1. An upstanding lug 58 mounted at the center of the cross member 30 bridging the reel arms 18 and 20 pivotally mounts a hydraulic cylinder 56 pivotally connected at its other end to the lug 52 carried by the blower frame 32. The cylinder 56 is power operated by a pair of hydraulic lines, such as shown at 59 extending from the combine. Upon being actuated the cylinder 56 is adapted to pivot the frame 32 about the pivot means 54. In this manner a finer adjustment of the blower frame and the blower may be accomplished in order that the air emanating from the blower will be directed toward the cutter assembly 16 and will take into account such variables as grain height and the like.

Referring more specifically to FIGURES 3, 4, and 7, a blower housing generally designated by the numeral 60 is shown. The blower housing is formed in four sections 62, 64, 66 and 68. Each section houses a fan unit generally referred to as 70 comprising a plurality of rotatable vanes 72. Each of the housing sections is spaced by means of an approximately semi-circular aperture 74. The bars 42, 44 and 46 of the frame 32 are adapted to mount the blower housing by extending through each of the apertures 74 formed in the blower housing and having bearing blocks 76, see FIGURE 3, attached to each of the bars 42, 44 and 46 which journal the fan shaft 78 extending through the blower housing and mounting the fan vanes 72. The blower unit housing is also attached to the frame 32 on the ends thereof by means of L-shaped brackets 80. The fan shaft 78 is also journaled in bearing blocks 82 and 84 mounted on the frame ends 34 and 36. The blower housing 60 is suitably apertured at its ends as indicated at 86 to admit air into the blower housing for use with the vanes 72. Suitable apertures, not shown, are also formed in the housing 60 adjacent the apertures 74 for entrance of air into the blower housing.

The fan shaft 78 is driven by suitable means such as a pulley 88 mounted on the shaft at one end thereof and cooperating with an endless belt 90 entrained about the pulley 88 and a drive pulley 92. The pulley 92 is driven by suitable electrical means mounted upon the combine.

Referring now more specifically to FIGURES 4, 5 and 6 a baffle extension designated by the numeral 94 is provided at the outlet end 96 of the blower housing 60, and is attached thereto by any suitable means. The baffle extension 94 is generally rectangular in cross section and comprises side plates 98 and 100. The baffle extension, see FIGURE 5 in particular also comprises upper and lower plates 102 and 104. A plurality of baffle plates 106, 108 are hingedly connected to the top wall or top plate 102 of the baffle extension 94 as indicated at 112 and 114 while baffle plate 110 is hingedly connected as shown at 116 to the bottom plate 104. It should be apparent that by varying the extent of projection of the baffle plates into the airflow emanating from the blower housing the volume of air impinging upon the grain stalks may be controlled as well as the direction thereof. The means for varying the extent of the baffle plates into the airflow includes arcuate slots 118, 120 and 122 formed in the end walls or plates 98 and 100 of the baffle extension 94. Mounted at the end of each baffle plate 108, 110, and 106 are upstanding lugs 124 on both side edges of the laterally extending baffle plates. Connecting these lugs 124 and hence the baffle plates to their associated arcuate slots are pin means such as shown at 126 extending through the arcuate slot associated with each baffle plate and terminating in a threaded portion adapted to cooperate with a wing nut such as shown at 128. Welded to each of the upstanding lugs 124 of the respective baffle plates is a nut 130. It should be evident by an inspection of FIGURE 6 that upon loosening the wing nut or handle 128 the baffle plate associated therewith may be pivoted upon its respective hinge within an arcuate slot and may be held in its adjusted position by merely rotating the wing cap or handle in the opposite direction to clamp the baffle plate in its adjusted position. It should be evident from an inspection of FIGURE 5 that the baffle plate 106 will control the volume of air emanating from the blower housing 60 whereas the cooperation of the baffle plates 108 and 110 can be adjusted to control the direction of the air emanating from the baffle extension 94.

The operation of the device will now be evident from an inspection of FIGURE 2. After adjusting the frame 32 to a desired height and tilting the blower housing 60 to a desired angle the fan shaft 78 may be caused to rotate thereby forcing air out of the blower outlet 96 through the baffle extension plate 94. The direction of the air and amount thereof emanating from the baffle extension 94 may be adjusted by the variable baffle means. The air blast 132 will impinge upon the grain stalks 134 causing them to lean towards the cutter means 16 which causes such means to cut better and evenly and prevents any grain waste due to a reel contacting the grain heads and crushing the same. Obviously, the air emanating from the blower assembly may be adjusted at will to therefore operate the combine at a faster speed than is possible with the conventional type of reel. The force of the air emanating from the baffle extension 94 will also keep the cutter bar clean and force the grain onto the conveyor 14 leading into the combine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a combine of the type including a header provided with means vertically adjusting the latter and having a cutter assembly and a conveying means mounted behind the cutter assembly to carry away cut grain together with vertically adjustable reel support arms; the improvement comprising a support frame movably mounted upon said support arms for movement therewith and for tilting movement independently thereof, a blower means mounted upon said support frame, an air inlet means for said blower means and air outlet means connected to said blower means and receiving air therefrom and directionally discharging air therefrom downwardly upon grain to be cut and causing the grain to incline toward said cutter assembly, said blower means including a housing having longitudinally spaced inwardly recessed portions, a blower shaft disposed longitudinally in said housing and extending across said recessed portions, blower impeller sections on said shaft each received in said housing between a pair of adjacent recessed portions, said support frame including support bars each received in a recessed portion and supporting said housing.

2. The combination of claim 1 wherein said support frame is disposed between and has its ends pivoted to said support arms, tilting means connected to said support arms and to said support frame and adjustably tilting said support frame relative to said support arms.

3. The combination of claim 1 including bearings each mounted upon one of said support bars and disposed in one of said recessed portions, said shaft being journaled in said bearings.

4. The combination of claim 1 wherein said air inlet means comprises openings in the end walls of said housing and openings from the housing into each of said recessed portions.

5. The combination of claim 1 wherein said outlet means comprises a duct having air inlet opening communicating with said blower housing and an outlet opening volume control and air directional baffles mounted in said duct and movable pivotally to adjusted positions projecting inwardly into the duct.

6. The combination of claim 5 wherein said baffles comprise a first baffle disposed adjacent said inlet opening and a pair of additional baffles disposed at the outlet opening and defining therebetween an outlet passage whose axis is adjustable by coordinated pivoting of said additional baffles.

7. The combination of claim 6 wherein said duct comprises an extension secured to said housing at its inlet opening.

8. The combination of claim 5 wherein said duct and its outlet opening extends across substantially the entire length of said blower housing.

References Cited in the file of this patent
UNITED STATES PATENTS

| | | |
|---|---|---|
| 770,263 | Claunch | Sept. 20, 1904 |
| 1,050,540 | Hohman | Jan. 14, 1913 |
| 1,794,658 | Walsh | Mar. 3, 1931 |
| 2,710,516 | Kaesemeyer et al. | June 14, 1955 |
| 2,873,567 | Vogelaar et al. | Feb. 17, 1959 |